United States Patent [19]

Sakamoto et al.

[11] 4,450,676
[45] May 29, 1984

[54] APPARATUS FOR STRANDING OPTICAL FIBER CORES WHILE SLACKENING THEM

[75] Inventors: Katsuji Sakamoto; Yasunori Saito, both of Kanagawa, Japan

[73] Assignee: Sumitomo Electric Industries, Ltd., Osaka, Japan

[21] Appl. No.: 404,742

[22] Filed: Aug. 3, 1982

[30] Foreign Application Priority Data

Aug. 3, 1981 [JP] Japan ................... 56-121698

[51] Int. Cl.$^3$ .................. D02G 3/44; D01H 13/04
[52] U.S. Cl. ........................... 57/6; 57/293; 57/352
[58] Field of Search .................. 57/6, 9, 293, 352

[56] References Cited

U.S. PATENT DOCUMENTS

| 4,154,049 | 5/1979 | King et al. ............... 57/352 X |
| 4,195,468 | 4/1980 | King et al. ............... 57/9 |
| 4,205,899 | 6/1980 | King et al. ............... 57/9 X |
| 4,248,035 | 2/1981 | Skillen et al. ............ 57/6 |
| 4,257,675 | 3/1981 | Nakagome et al. ...... 57/6 X |
| 4,347,697 | 9/1982 | Hope et al. ............... 57/9 |

Primary Examiner—Donald Watkins
Attorney, Agent, or Firm—Sughrue, Mion, Zinn, Macpeak and Seas

[57] ABSTRACT

An apparatus for stranding optical fiber cores while slackening the same in which optical fiber cores are pushed into core storing spaces which are to be twisted or twisted core storing spaces. A core delivering system has a passage for passing the optical fiber cores therethrough and a gas which flows from the back position of said passage towards the front position thereof functions to send out the optical fiber cores at the inlet side of said core storing spaces. The tensile forces of the optical fiber cores at the inlet sides of the core delivering system are decreased by a winding drum mechanism.

12 Claims, 8 Drawing Figures

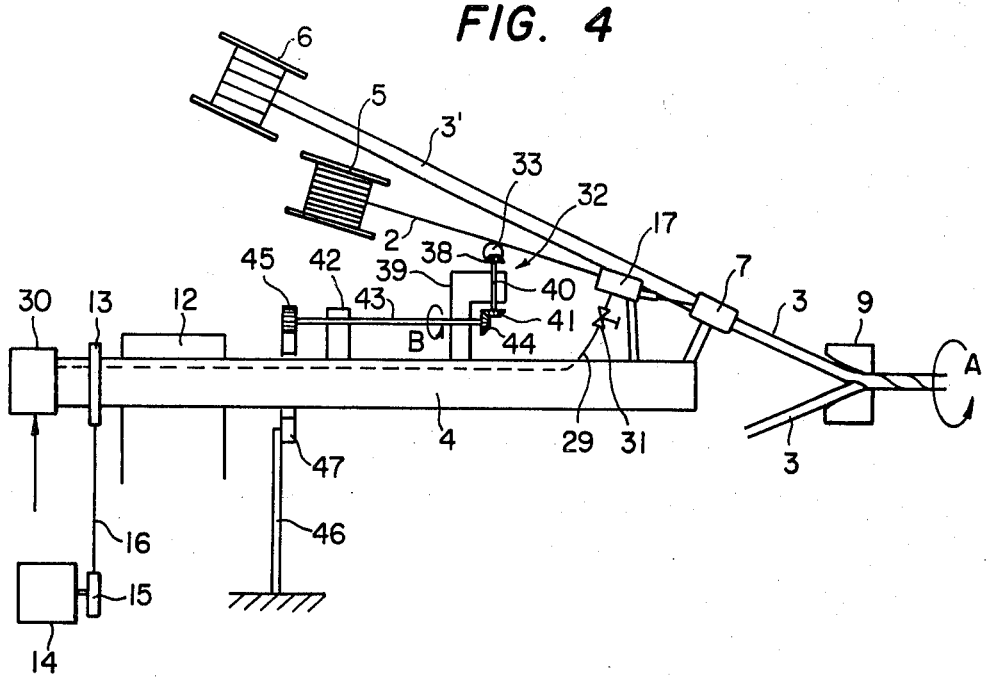
FIG. 4
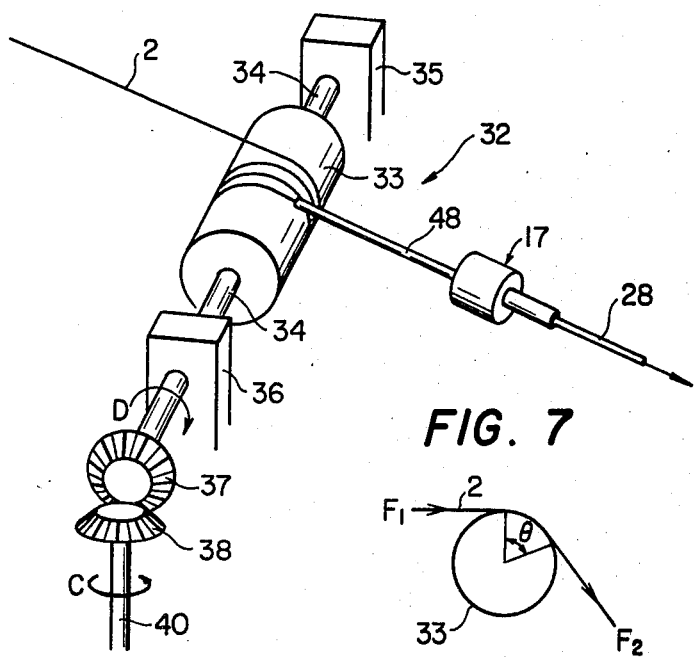
FIG. 6
FIG. 7

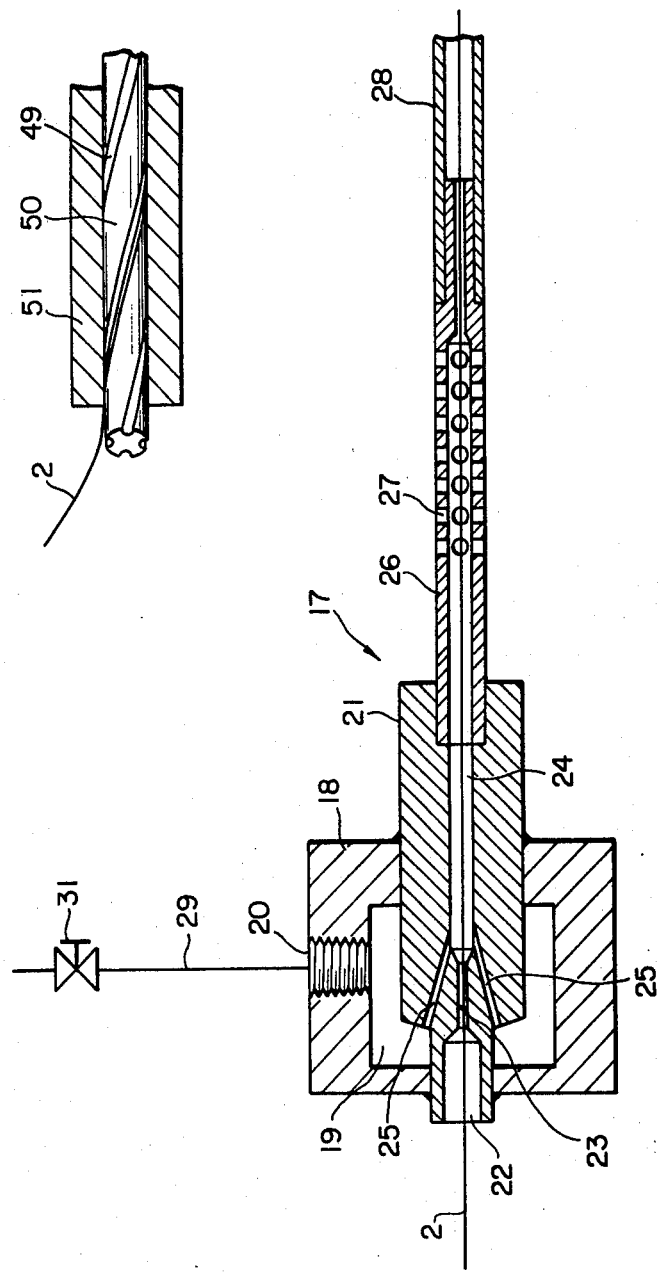

APPARATUS FOR STRANDING OPTICAL FIBER CORES WHILE SLACKENING THEM

BACKGROUND OF THE INVENTION

The present invention relates to an apparatus for stranding optical fiber cores while in a slackened state.

Recently, optical fiber cores have been used in communications on land as well as in the sea. A principle use is as an optical fiber cable (which is also called "optical cable"), and the range of application thereof is expanding.

In some applications, it is known that a tensile force works on the optical cable so that the optical cable will be stretched. This is especially true in undersea use. The tensile force works even in the case where the optical cable is installed on land-based system. If the optical cable is subjected to a tensile force, the optical fiber core is also subjected to a tensile stress. If the optical fiber core is subjected to such tensile stress for a long period of time, a breakdown phenomenon is experienced which produces an extremely bad influence upon the life of the cable.

The optical fiber core may be slackened in advance when it is manufactured in order to reduce or eliminate the stress induced when in actual use. Methods for slackening the optical fiber core have been proposed in the art. In accordance with one of the proposed methods, there is provided a strand 1 as shown in FIG. 1. This strand 1 has optical fiber cores 2 placed respectively into pipes 3 in such a manner as to slacken them in the pipes 3 and then the pipes 3 are twisted. Usually, the optical fiber cores 2 are positioned in the pipes 3 to be near the outer periphery of the strand 1. Even if the tensile force works to stretch strand 1, the optical fiber cores 2 slacken against the tension slackened to move towards the central portions, so that the tensile force is removed from the optical fiber cores 2.

The strand 1 as mentioned above has been produced in accordance with the apparatus as shown in FIG. 2. In this device, a plurality of bobbins 5 deliver optical fiber cores 2 around a main shaft 4 which is rotatable around its longitudinal axis. A plurality of bobbins 6 deliver strips 3' from which pipes 3 are made and a plurality of formers 7 are used for forming the strips 3' into pipes 3. Rollers 8 push the optical fiber cores 2 into the pipes 3 and a twisting die 9 located at the end of the main shaft 4. The strips 3' from the bobbins 6 are formed into the pipes 3 by the former 7, and the optical fiber cores 2 from the bobbins 5 are pushed into the pipes 3 by means of the rollers 8 to take a slacken state therein. Furthermore, pipes 3 are introduced into the above-mentioned twisting die 9 to be twisted by rotating the main shaft 4.

As shown in FIG. 3, the above-mentioned pushing rollers 8 in this apparatus are driven by means of an electric motor 10 with a constant torque via a slide clutch 11 which is electrically or mechanically controlled. Thus, the force to push the optical fiber cores 2 into the pipes 3 by means of the pushing rollers 8 is maintained constant.

The force necessary for pushing the optical fiber cores into the pipes is about 10 g, and thus the force is small. If the force is large, buckling occurs so that microbending of the cores occurs. It is, however, difficult to secure such low values for the tensile force in accordance with the conventional apparatus because the bearing resistance operates on the clutch for transmitting the driving power to the pushing rollers 8, the shaft and the rotary bearings of the pushing rollers 8. Furthermore, the value of the bearing resistance varies considerably. For example, in the case of a roller bearing with a shaft diameter of approximately 10 mm, the static rotary torque is about 2 g cm. If then the rotation speed is 30/min., the static rotary torque is at least 8 g cm. Therefore, if four bearings are used, the static rotary torque becomes 32 g cm. If the diameter of the pushing roller 8 is 3 cm, its peripheral rotary resistance becomes 21 g, and thus, a great weight is required for the required pushing force which is about 10 g. Stated differently, the degree that the variance in the rotary resistance contributes to the variance in the pushing force increases.

SUMMARY OF THE INVENTION

The present invention has been achieved to overcome these deficiencies of the prior art. An object of the present invention is to make it possible to push optical fiber cores into pipes or the like with a small and stable force when the optical fiber cores are pushed into the core storage spaces in the pipes, spacers or the like to result in a strand.

Another object of this invention is to provide an apparatus that inserts optical fiber cores into storage areas in a slackened state without any micro-bending.

In an apparatus in which the optical fiber cores are pushed into the core storage spaces which are to be twisted or the already twisted core storage spaces while slackening the optical fiber cores, the present invention achieves the above-mentioned objects by providing in the passages, through which the optical fiber cores are passed, a delivery system for the optical fiber cores using a gas which flows from the rearward position of the passages towards the forward position thereof. This gas urges the optical fiber cores with a uniform force from the passages at the inlet and into the above-mentioned spaces for storing the cores. A technique for decreasing the tensile force of the optical fiber cores at the inlet side of the delivering system of the cores is employed to slacken the cores.

The present invention will be explained in detail by reference to the embodiment which is shown in the accompanying drawings.

BRIEF DESCRIPTION OF THE DRAWINGS

FIG. 4 is a schematic view showing one embodiment in accordance with the present invention;

FIG. 5 is a vertical cross-sectional view of the core delivering system;

FIG. 6 is a perspective view showing the system for decreasing the tensile force;

FIG. 7 is an explanatory view showing the decrease of the tensile force; and

FIG. 8 is a side view of a spacer.

DESCRIPTION OF THE PREFERRED EMBODIMENTS

Figure 1:
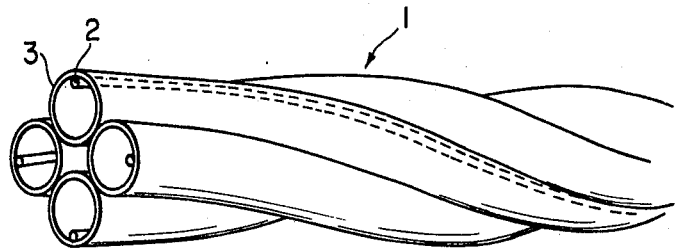
FIG. 1 is a perspective view showing a slackened strand.
Figure 2:
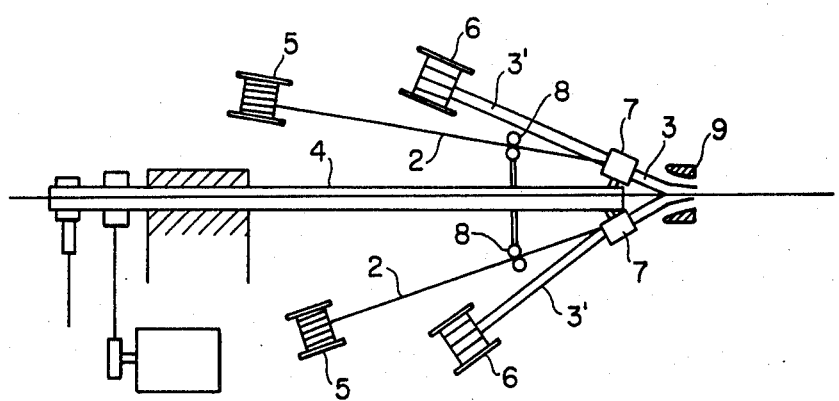
FIG. 2 is a schematic view showing a conventional apparatus for twisting the cores while slackening them.
Figure 3:
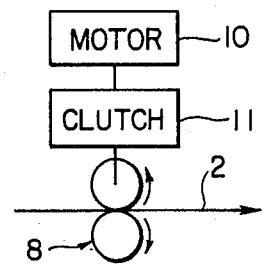
FIG. 3 is a detailed view of the pushing rollers in FIG. 2.

FIG. 4 shows a schematic arrangement of one embodiment. Referring to that Figure, a main shaft 4 is rotatably supported on a bearing block 12 and a pulley 13 is mounted at the end of the shaft 4. A belt 16 is provided around the pulley 13 and another pulley 15 which is directly connected to a motor 14 so that the main shaft 4 is driven and rotated around its longitudinal axis when the motor 14 is driven. Rotatably supported bobbins 5 are provided corresponding to the number of cores which are to be twisted via a supporting member (not shown) around the middle portion in the longitudinal direction of the main shaft 4. In addition, rotatably supported strip bobbins 6 of the same number as the core bobbins 5 are disposed around the main shaft 4 via a supporting member (not shown).

A former 7 corresponding in number to the number of strip bobbins 6 is positioned around the end of the main shaft 4. A core delivering means 17 is disposed at the inlet side of each of the formers 7 in such a way to be supported on the main shaft 4. This core delivering means 17 is shown in detail in FIG. 5.

Referring to FIG. 5, numeral 18 denotes an inlet block which has a pressure chamber 19 formed therein and an inlet 20 for introducing a gas into the pressure chamber 19. A nozzle 21 is provided in such a way as to pass through inlet block 18 in the forward and rearward direction. Also provided are an inlet 22 of large diameter, a small diameter hole 23 which prevents the back flow of the gas, and a hole 24 of large diameter through which the gas flows in such a way to extend from one end (inlet side) to the other end (outlet side) along the longitudinal axis of the nozzle 21. Holes 22, 23 and 24 form passages through which the optical fiber cores 2 are passed.

There are also provided in the nozzle assembly, blow holes 25 which extend obliquely backwards in such a way as to be connected to the hole 24 through which the gas flows and in communication with the pressure chamber 19 at the end of the inlet side of the hole 24 through which the gas flows. In the blow holes 25, the pressurized gas is blown into the hole 24 through which the gas flows. On the other hand, an outlet pipe 26 is connected to the hole 24 through which the gas flows at the outlet side of the nozzle 21. Outlet pipe 26 is provided with a plurality of exhaust openings 27 for exhausting air which is blown into the hole 24 through which the air flows. A flexible tube 28 for introducing the optical fiber cores 2 towards the former 7 is connected to the outlet pipe 26. In addition, a tube 29 for supplying the air is connected to the gas inlet 20 of the inlet block 18. Tube 29 passes through the main shaft 4 and is connected to a source for supplying the pressurized air via a swivel joint 30 for supplying the air which is provided at the rearward end of the main shaft 4. Reference numeral 31 denotes a valve for adjusting the pressure.

In accordance with the core delivering system 17 shown in FIG. 5, the optical fiber core 2 is passed through the hole 23 for preventing the back flow of the gas and the hole 24 through which the gas flows from the inlet 22 at the initial stage for delivering the optical fiber core 2. In this case, the gap between the inner surface of the hole 23 for preventing the back flow of the gas and the optical fiber core 2 is small, and on the other hand, the gap between the inner surface of the hole 24 through which the gas flows and the optical fiber core 2 is large. In addition, the blow hole 25 is given a specific orientation.

As the result, the flow rate of the gas which flows on the outer periphery of the optical fiber core 2 in the direction in which the core 2 flows and the length over which the gas is in contact with the core 2 in the hole 24 through which the gas flows are much larger than those in the hole 23 for preventing the back flow of the gas. Therefore, if the condition for the optical fiber core 2 such as the dimension, the quality of material or the like is set, the optical fiber core 2 is sent to the outlet side by a shearing force which is determined, in accordance with the viscosity of the gas and the shearing speed of the gas in the vicinity of the outer periphery of the core 2. Since the force to move the optical fiber 2, that is, the force for pushing the core is determined by the viscous resistance of the gas and the flow rate thereof, the pushing force is maintained constant so long as the gas content as well as the flow rate are constant. Factors which cause variations are the disturbance of the flow of the gas and the friction between the core 2 and the inner wall of the hole. However, the former condition is a very short variation in the period of use, in other words, the vibration. As far as the latter is concerned, any variance of the pushing force is unlikely to occur because the gas uniformly flows around the optical fiber core 2. Thus, the core 2 does not firmly contact the wall surface. Therefore, if the values of the flow rate of the gas as well as the length of the hole 24 through which the gas flows are properly set, it becomes possible to obtain the required stable pushing force.

In accordance with experimental results, an substantial variation was not observed in the force of 10 g for pushing the core. This observation was obtained for the case wherein the diameter of the hole 24 through which the gas flows is 2 mm, the length thereof is 30 mm, air is used as the gas and the flow rate thereof is 300 m/s.

It is possible to obtain a small and stable pushing force (for example, 10 g) in accordance with this core delivering system 17, but since the force is of a small value, it is required that the tensile force of the optical fiber core 2 at the inlet 22 have a correspondingly small value such as several g. Therefore, as shown in FIG. 6, there is provided a system 32 for decreasing the tensile force at the inlet side of the core delivering system 17 in such a way as to be supported on the main shaft 4.

The system 32 for decreasing the tensile force is composed of a winding drum 33 around which the optical fiber core 2, from the core bobbin 5 is wound and a driving means thereof. The longitudinal shaft 34 of the winding drum 33 is supported by bearings 35, 36 on the main shaft 4. A bevel gear 37 is mounted at one end of the longitudinal shaft 34, and another bevel gear 38 which engages bevel gear 37 is mounted at one end of a shaft 40 which is supported by a bearing block 39 on the main shaft 4 (see FIG. 4). At the other end of the shaft 40, a bevel gear 41 is mounted. A shaft 43 is supported by the above-mentioned bearing block 39 and another bearing block 42 on the main shaft 4. A bevel gear 44 which engages the bevel gear 41 is mounted at one end of shaft 43. A spur gear 45 is mounted at the other end of this shaft 43. This spur gear 45 engages a ring-like bevel gear 47 which is fixed to a bracket 46 and through the central portion of which the main shaft 4 is passed.

Therefore, if the main shaft 4 is rotated in the direction as indicated by the arrow A in FIG. 4, the spur gear 45 moves on the fixed spur gear 47 and thus rotates so that the shaft 43 rotates in the direction indicated by the arrow B, the shaft 40 rotates in the direction indicated by the arrow C via the bevel gears 44, 41. Furthermore, the center shaft 34 and the winding drum 33 rotate in the direction indicated by the arrow D. The rotation speed of the winding drum 33 is set higher than the feeding speed of the optical fiber core 2. The tensile force of the optical fiber core 2 at the inlet side of the winding drum varies greatly as a function of the variation in the rotation power of the core bobbin 5. As one example, the value thereof is ±50 g or more if the tensile force setting value which is approximately 200 g as the center. The value of the core tensile force of the winding drum 33, for example, is acceptable if a value equal to or smaller than 2 g can be realized.

It becomes possible to do so by properly determining the number of windings of the optical fiber core 2 around the winding drum 33. If, referring to FIG. 7, the tensile force of the optical fiber core 2 at the inlet side of the winding drum 33 is $F_1$, the tensile force at the outlet side is $F_2$, the winding angle is $\theta$ (rad), the kinetic friction coefficient between the core 2 and the winding drum 33 is $\mu$ as shown in FIG. 7, that $F_1/F_2 = e^{\mu\theta}$ in accordance with accepted theory of a drum brake. For actual values, if $F_2$ is 2 g when $\mu = 0.2$ and $F_1 = 250$ g, then, $\theta = 24.2$ (rad) = 3.85 turns = 4 turns. Stated differently, if the optical fiber core 2 is wound around the winding drum 33 four times, it becomes possible to obtain the value of $F_2$ which is equal to or smaller than 2 g even if $F_1$ varies. In this case, reference numeral 48 denotes a pipe which is provided between the outlet side of the winding drum 33 and the inlet side of the core delivering system 17, to prevent the core 2 from sagging of its own weight. This is effective to stabilize the value of $F_2$. As a means to decrease the tensile force other than that mentioned above, a "catenary control" may be employed in accordance with which the core 2 is made to sag freely, the sagging amount is detected and the rotation rate of the core bobbin 5 is controlled.

A twisting die 9 is positioned in front of the main shaft 4. This is consistent with the prior art system.

An explanation will be given of the technique for twisting the optical fiber cores 2 in accordance with the twisting apparatus of this invention.

The strips 3' delivered from the strip bobbins 6 are respectively formed into pipes 3 by the former 7 corresponding to a known structure. On the other hand, the tensile force of the optical fiber cores 2 which are delivered from respective core bobbins 5 are decreased (for example, to become equal to or smaller than 2 g) by the system 32 for decreasing the tensile force. Then, the optical fiber cores 2 are pushed into the pipes 3 with a small and stable pushing force (for example, 10 g) by the core delivering system 17. The optical fiber cores 2 are thus pushed into the pipes 3 to slacken in the pipes 3. The pipes 3 are respectively introduced into the twisting die 9 at the front end of the main shaft 4, to be twisted as the main shaft 4 is rotated.

In accordance with the above-mentioned embodiment, the core storage spaces are provided in the pipes 3 which are to be twisted so that the optical fiber cores 2 are pushed therein. However, it is also within the scope of this invention if the optical fiber core 2 is preformed by being pushed into a spiral groove 49 in the spacer 50 as shown in FIG. 8. Reference numeral 51 denotes a sleeve outside the spacer 50.

In the above, the present invention has been explained in detail based on the embodiments. In accordance with the apparatus of this invention for twisting the optical fiber cores while slackening the same, the tensile force of the optical fiber core is decreased by the means for decreasing the tensile force, and then, the optical fiber core is pushed into the core storing space in the pipe, spacer or the like with a small and stable pushing force utilizing the viscous resistance of the gas by the core delivering means. As the result, it becomes possible to obtain an excellent slackened strand without the buckling of the core.

What is claimed is:

1. An apparatus for stranding optical fiber cores in a slackened state into a core storage tube, comprising:
   means to form a tube;
   core delivering means having a passage for passing an optical fiber core therethrough, a source of gas and flow passages for directing said gas through said passage in a direction of movement of said core, said gas urging said core through said delivery means under a constant force into said core storage tube; and
   means for reducing the tensile force on said optical fiber core at the inlet side of said core delivering means.

2. The apparatus of claim 1, wherein said core delivering means comprises; an inlet block having a pressure chamber therein, a nozzle mounted in said inlet block, said inlet block including an axial passage for passing said optical fiber core and flow means in said nozzle for establishing fluid communication between said pressure chamber and said axial passage.

3. The apparatus of claim 2, wherein said axial passage has a first portion of reduced diameter and a second portion of increased diameter in fluid communication with said flow means.

4. The apparatus of claims 2 or 3, wherein said flow means is oriented relative to said axial passages to direct gas under pressure in a flow direction corresponding to the direction of movement of said optical fiber core through said axial passage.

5. The apparatus of claims, further comprising an outlet pipe connected to said nozzle, a plurality of exhaust openings in said outlet pipe and a flexible tube defining an outlet from said delivering means to a former of said core storage location.

6. An apparatus for stranding optical fiber cores in a slackened state into a core storage tube, comprising:
   means to form a tube;
   core delivering means having a passage for passing an optical fiber core therethrough, a source of gas and flow passages for directing said gas through said passage in a direction of movement of said core, said gas urging said core through said delivery means under a constant force into said core storage tube; and
   means for reducing the tensile force on said optical fiber core at the inlet side of said core delivering means;
   wherein said core delivering means comprises: an inlet block having a pressure chamber therein, a nozzle mounted in said inlet block, said inlet block including an axial passage for passing said optical fiber core and flow means in said nozzle for establishing fluid communication between said pressure chamber and said axial passage; and
   wherein said axial passage has a first portion of reduced diameter and a second portion of increased diameter in fluid communication with said flow means.

7. The apparatus of claim 6, wherein said flow means is oriented relative to said axial passages to direct gas under pressure in a flow direction corresponding to the direction of movement of said optical fiber core through said axial passage.

8. The apparatus of claim 6, further comprising an outlet pipe connected to said nozzle, a plurality of exhaust openings in said outlet pipe and a flexible tube defining an outlet from said delivering means to a former of said core storage location.

9. An apparatus for stranding optical fiber cores in a slackened state into a core storage tube, comprising:
 means to form a tube;
 core delivering means having a passage for passing an optical fiber core therethrough, a source of gas and flow passages for directing said gas through said passage in a direction of movement of said core, said gas urging said core through said delivery means under a constant force into said core storage tube; and
 means for reducing the tensile force on said optical fiber core at the inlet side of said core delivering means comprising: a winding drum receiving said optical fiber core and having a number of turns therearound, a main shaft mounted for rotation for turning a former of said core storage location, and means to rotate said winding drum as a function of rotation of said main shaft.

10. The apparatus of claim 9, wherein said means to rotate comprises first gear means responsive to rotation of said main shaft, an output shaft associated with said first gear means, second gear means coupled to said output shaft to rotate said winding drum, and said first and second gear means having a drive configuration to rotate said winding drum at a speed greater than the feeding speed of said optical fiber core to said winding drum.

11. The apparatus of claim 10, further comprising means to support said optical fiber core from the outlet of said winding drum to the inlet of said delivering means.

12. An apparatus for stranding optical fiber cores in a slackened state into a core storage tube, comprising:
 means to form a tube including means to deliver a supply of strip material to said forming means in order to construct a plurality of tubes and means to twist said tubes, each containing an optical fiber core into a core storage location;
 core delivering means having a passage for passing an optical fiber core therethrough, a source of gas and flow passages for directing said gas through said passage in a direction of movement of said core, said gas urging said core through said delivery means under a constant force into said core storage tube; and
 means for reducing the tensile force on said optical fiber core at the inlet side of said core delivering means.

* * * * *